(12) United States Patent
Gorlinskiy et al.

(10) Patent No.: US 10,077,875 B2
(45) Date of Patent: Sep. 18, 2018

(54) LIGHT-EMITTING DIODE LAMP

(71) Applicant: VITRULUX LIMITED LIABILITY COMPANY, Saint-Petersburg (RU)

(72) Inventors: Bronislav Vladislavovich Gorlinskiy, Saint-Petersburg (RU); Yuri Sergeevich Panteleev, Saint-Petersburg (RU)

(73) Assignee: Vitrulux Limited Liability Company, Saint-Petersburg (RU)

( * ) Notice: Subject to any disclaimer, the term of this patent is extended or adjusted under 35 U.S.C. 154(b) by 0 days.

(21) Appl. No.: 15/247,140

(22) Filed: Aug. 25, 2016

(65) Prior Publication Data

US 2017/0002989 A1    Jan. 5, 2017

Related U.S. Application Data

(63) Continuation of application No. 14/232,334, filed as application No. PCT/RU2012/000583 on Jul. 13, 2012, now Pat. No. 9,435,495.

(30) Foreign Application Priority Data

Jul. 14, 2011    (RU) ................................ 2011130786

(51) Int. Cl.
*F21V 5/04*    (2006.01)
*F21K 9/69*    (2016.01)
(Continued)

(52) U.S. Cl.
CPC .................. *F21K 9/69* (2016.08); *F21K 9/60* (2016.08); *F21K 9/66* (2016.08); *F21V 5/002* (2013.01);
(Continued)

(58) Field of Classification Search
None
See application file for complete search history.

(56) References Cited

U.S. PATENT DOCUMENTS

2003/0081419 A1* 5/2003 Jacob ........................ F21S 8/04
362/364
2005/0007777 A1* 1/2005 Klipstein ................ F21L 4/005
362/244

(Continued)

FOREIGN PATENT DOCUMENTS

WO    WO 2008/021082 A2    2/2008

OTHER PUBLICATIONS

International Search Report issued in PCT/RU2012/000583 dated Jul. 13, 2012.

*Primary Examiner* — Andrew Coughlin
(74) *Attorney, Agent, or Firm* — Hoffman & Baron, LLP

(57) ABSTRACT

A light-emitting diode lamp includes an optically-transparent lens and an assembly. The lens includes a parabolic section defined about an axis and having a focus. The section includes a surface extending from the axis to a periphery of the section at a first end of the section, and a channel extending along the axis partially inside the section at a second end of the section. The assembly includes a chip and a dome. The chip is disposed in the channel at the focus of the section. The dome is disposed in the channel forming an interior space between the dome and the lens. The space is filled with an optically-transparent material having an index of refraction approximately equal to an index of refraction of the lens that eliminates or reduces effect of an optical interface between the material and the lens on direction of light emitted by the chip.

20 Claims, 4 Drawing Sheets

(51) Int. Cl.
*F21V 5/00* (2018.01)
*F21V 7/00* (2006.01)
*G02B 19/00* (2006.01)
*F21K 9/60* (2016.01)
*F21K 9/66* (2016.01)
*F21V 5/02* (2006.01)
*F21Y 101/00* (2016.01)
*F21Y 105/10* (2016.01)
*F21K 9/23* (2016.01)
*F21Y 115/10* (2016.01)

(52) U.S. Cl.
CPC ............... *F21V 5/007* (2013.01); *F21V 5/02* (2013.01); *F21V 5/04* (2013.01); *F21V 5/048* (2013.01); *F21V 7/0091* (2013.01); *G02B 19/0028* (2013.01); *G02B 19/0066* (2013.01); *F21K 9/23* (2016.08); *F21Y 2101/00* (2013.01); *F21Y 2105/10* (2016.08); *F21Y 2115/10* (2016.08)

(56) References Cited

U.S. PATENT DOCUMENTS

2005/0219840 A1* 10/2005 Holder ................. F21V 7/0091
    362/187
2006/0209562 A1    9/2006 Lee et al.
2009/0225552 A1    9/2009 Chen
2011/0116284 A1    5/2011 Richardson

* cited by examiner

LIGHT-EMITTING DIODE LAMP

CROSS-REFERENCE TO RELATED APPLICATION

This application is a continuation of U.S. application Ser. No. 14/232,334, filed on 13 Jan. 2014, now U.S. Pat. No. 9,435,495, which is the U.S. National Phase of International Patent Application No. PCT/RU2012/000583, filed on 13 Jul. 2012, which claims benefit of Russian Federation Utility Model Application No. 2011130786, filed on 14 Jul. 2011, the contents of all foregoing applications incorporated herein by reference in their entirety.

BACKGROUND

Field

The present application relates to lighting technology. More specifically, the present application is directed to a light-emitting diode (LED) lamp (e.g., lighting fixture) with improved light efficacy (efficiency).

Brief Discussion of Related Art

Light sources, such as light-emitting diodes (LEDs), are a highly-attractive alternative for various lighting applications. In contrast to conventional light sources, LEDs enjoy a relatively long life span, high light output and low power consumption. In recent years, various LED lamps, which include one or more LEDs, have been designed and implemented for indoor, as well as outdoor applications.

LEDs can vary in operational characteristics for different lighting applications from minimal (e.g., about 3 lumens per watt (lm/W)) up to maximal (e.g., about 200 lm/W) operational characteristics. These operational characteristics have undergone significant changes in recent years, and will likely continue to improve.

For applications that require a large amount of light, such as outside lamps (e.g., streetlights) and other similar applications, a multiplicity of LEDs is often used (e.g., 30 LEDs-48 LEDs, or more). With higher wattage, LEDs experience limits to light output and suffer from rising heat. Accordingly, heat dissipation has been an ongoing concern for such applications.

In various applications, LEDs are generally disposed inside a housing, and the light emitted from the LEDs is generally transmitted through various optically-transparent media (e.g., plastic, silicone, glass, air, and/or others) in order to exit the housing. For visible light, most transparent media generally have refractive indices between about 1 and about 2, e.g., air having a refractive index of about 1, and glass has a refractive index of about 1.4 to about 1.6.

Light rays generally refract at the interface of media having different refractive indices. Light rays can also be reflected (e.g., internal reflection) to varying degrees at the interface based on their angle of incidence (e.g., complete reflection occurring at an incidence angle that is greater than a critical angle based on a refractive index of the particular medium). Accordingly, some light rays emitted from the multiplicity of LEDs can reflect from one or more media to the inside of the housing, limiting the overall light efficacy of the LED lamp.

Conventional reflectors, especially those having a parabolic shape, have been used in various lighting applications to focus light emitted from the light sources. Specifically, a light source is disposed at the focus of the reflector. Direct light rays (not reflected from the surface of the reflector) produce a conical beam with respect to the axis of the reflector, while the reflected light rays (i.e., reflected from the surface of the reflector) form a collimated beam in which light rays are parallel to the axis of the reflector.

While focusing the reflected light rays can minimize the potential reflection of these light rays to the inside of the housing, conventional reflectors cannot focus the direct light rays in the conical beam that are at an angle with respect to the axis of the reflector. Some of these rays, especially those toward the periphery of the light cone (peripheral light rays), can reflect from one or more media to the inside of the housing, limiting the overall light efficacy of the LED lamp.

Russian Federation Patent No. 94310 describes a "light-emitting diode lamp." This lamp includes a metal base and light-diode modules attached to it. Each module is a thin-walled composite substrate on which LEDs are disposed, each of which has a protective outer layer executed in the form of a translucent shell made of a polymeric, translucent material possessing high mechanical strength, made, for example, from a polycarbonate plastic, and a protective inner layer executed of a cured, translucent polymeric substance, which is a translucent compound, a luminophoric material, a polymerized, translucent resin, or mixtures thereof. The combination of the protective outer layer in the form of a translucent shell and the protective inner layer formed by a cured, translucent polymeric substance, forms a first optical system for each LED with predetermined optical characteristics, such as, for example, the angle of dispersion and the transmission coefficient.

Moreover, Russian Federation Patent No. 100179 describes a "light-emitting diode lamp for areal illumination." This lamp includes a body with a circuit board attached to it, on which there are disposed light-emitting diodes of a first optical system, each of which has a second optical system, as well as a protective screen executed of an optically-transparent material.

These known LED lamps do not have a high optical coefficient of efficiency (e.g., improved overall light efficacy or efficiency) because of high reflective losses and also because of failure to refract peripheral light rays.

It is therefore desirable to provide an LED lamp that mitigates the reflective losses of light rays and provides for refraction of peripheral light rays to improve the overall light efficacy of the LED lamp.

SUMMARY

In accordance with an embodiment, a light-emitting diode lamp is disclosed. The light-emitting diode lamp includes an optically-transparent lens and a light-emitting diode assembly. The optically-transparent lens includes a parabolic section defined about an axis and having a focus.

The parabolic section includes a continuous surface extending from the axis to a periphery of the parabolic section at a first end of the parabolic section, and a channel extending along the axis at least partially inside the parabolic section at a second end of the parabolic section, the second end being substantially opposed to the first end.

The light-emitting diode assembly includes a light-emitting chip and an optically-transparent dome. The light-emitting chip is disposed in the channel at the focus of the parabolic section. The optically-transparent dome is disposed in the channel such that an interior space is formed between the optically-transparent dome and the optically-transparent lens. The interior space is filled with an optically-transparent material having an index of refraction approximately equal to an index of refraction of the optically-transparent lens that eliminates or reduces effect of an optical interface between the optically-transparent material and the optically-transparent lens on direction of light emitted by the light-emitting diode chip.

These and other purposes, goals, and advantages of the present application will become apparent from the following detailed description of example embodiments read in connection with the accompanying drawings.

BRIEF DESCRIPTION OF THE DRAWINGS

Some embodiments are illustrated by way of example and not limitation in the figures of the accompanying drawings in which.

DETAILED DESCRIPTION

A light-emitting diode (LED) lamp, which mitigates reflective losses of light rays and provides for refraction of peripheral light rays to improve the overall light efficacy (efficiency) of the LED lamp, is disclosed herein. In the following description, for the purposes of explanation, numerous specific details are set forth in order to provide a thorough understanding of example embodiments. It will be evident, however, to one skilled in the art, that an example embodiment may be practiced without all of the disclosed specific details.

Figure 1:
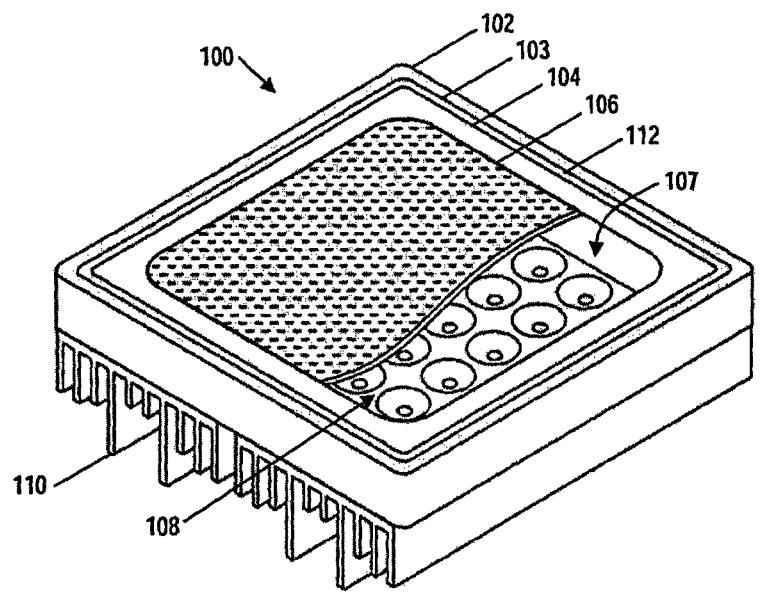
FIG. 1 illustrates an example light-emitting diode (LED) lamp.

FIG. 1 illustrates an example light-emitting diode (LED) lamp 100. The LED lamp 100 includes a housing 102, screen 104, layer 106, one or more light-source assemblies 108, and in some embodiments, a heat sink 110 and a bezel 112 can also be included. The LED lamp 100 can be any lighting fixture for indoors or outdoors. For example, the LED lamp 100 can be a lighting fixture or a device attached, connected, inserted, or screwed into a lighting fixture to provide light. In one example embodiment, the LED lamp 100 is connected to a light pole or base (not shown). In another example, the lamp is inserted into a lantern/luminaire (not shown). The LED lamp 100 can be used as a lighting fixture incorporated into overhang ceilings of gas stations for lighting during fueling, can also be incorporated into streetlights to provide areal lighting for residential as well as business complexes, can further be used for interior lighting of warehouses and exterior lots, and in one or more other lighting applications as may be desired.

The housing 102 can have different form factors for various lighting applications. In some embodiments, as shown in FIG. 1, the housing is approximately square, e.g., width of about 200 mm, length of about 200 mm and a height of 80 mm. As another example, the housing can have a width of about 400 mm, length of about 250 mm and a height of 120 mm. The housing 102 can generally have any desired dimensions allowing to secure at least one light-source assembly 108, and in some cases, one more electrical/electronic components, such that the at least one LED of the light-source assembly 108 can emit light. The housing 102 includes a recess 103 and an opening 107. The recess 103 is configured to secure the screen 104, while the opening 107 is configured to secure the light-source assemblies 108. While not shown in FIG. 1, the opening 107 of housing 102 can also secure a power supply, which can include a rectifier, to supply power to the light-source assemblies 108, as well as one or more electrical/electronic components to operate the LED lamp 100. The base of the housing 102 allows the power supply to be electrically connected to a source of electricity (not shown) to provide sufficient electricity to the power supply, which can then power the LEDs in the light-source assemblies 108 in order to provide light. The electrical/electronic components can include one or more gauges/switches/controls associated with light-generation control, brightness/dimness control, as well as ON/OFF control of light-source assemblies 108. Moreover, the electrical/electronic components can also include wireless transceivers (e.g., infrared) for similar controls, or different controls of the light-source assemblies 108.

The screen 104 is secured to the housing 102 and is configured to enclose and to protect the one or more light-source assemblies 108 disposed inside, as well as any other components (electric/electronic) disposed in the housing 102, from ambient air and weather. The screen 104 can be secured to the housing 102 using a bezel 112, can be pressure-fit into the opening 103 of the housing 102, glued into the opening 103 of the housing 102, and/or secured in any other way.

Furthermore, the screen 104 is made from an optically-transparent material that can include glass, plastic, thermoplastic (e.g., polymethyl methacrylate), another optically-transparent material or a combination of optically-transparent materials, which allow light to pass without scattering. At least one or both sides of the screen 104 are generally planar, and in some embodiments, the planar sides are parallel. In one or more embodiments, the screen 104 has a first index of refraction. For example, the index of refraction can be from about 1.4 to about 1.6. Other indices of refraction can be chosen for various lighting applications.

The layer 106 is configured to refract light as well as to diffuse light that is incident upon the layer 106, as will be described in greater detail below with reference to FIG. 6. At this point, it is sufficient to mention that the layer 106 is configured to include a random or pseudo-random array of lenses (e.g., variously sized and dimensioned) formed in a three-dimensional coordinate system over at least a portion of the layer 106. In some embodiments, the array of lenses can be formed to cover the entire opening 107 in the housing 102. The layer 106 is configured to mitigate the reflective losses of light rays inside the housing 102 and provides for refraction of peripheral light rays to the outside of the screen 104 in order to improve in part the overall light efficacy (efficiency) of the LED lamp 100. More specifically, the array of lenses included in the layer 106 reduces a possible loss of light—resulting from incidence of a portion of the light on flat non-adjacent surfaces of two media with similar/different indices of refraction—and thus improves the transmission of the light through the screen 104.

Moreover, the layer 106 is made of an optically-transparent material(s) as already described herein, or different than the material(s) described herein. The layer 106 has a second index of refraction. In one or more embodiments, the second index of refraction of the layer 106 is the same or similar to the first index of refraction of the screen 104 (e.g., about 1.4 to about 1.6). The layer is disposed or deposited atop the underside surface of the screen 104, as will be described in greater detail below with reference to FIG. 2. In some embodiments, the screen 104 and layer 106 can be used in an LED lamp with one or more different LEDs (e.g., with/without the lens 206, another lens, or reflector).

The one or more light-source assemblies 108 are configured to mitigate the reflective losses of light rays inside the housing 102 and provide for refraction (or focusing) of peripheral light rays toward the layer 106 in order to improve in part the overall light efficacy (efficiency) of the LED lamp 100. The components of the light-source assemblies 108 will be described in greater detail below with reference to FIGS. 2-5.

The heat sink 110 can be disposed at the bottom of the housing 102 to dissipate into the ambient environment any heat caused by the light-source assemblies 108 and/or other electric/electronic components of the LED lamp 100. Various other heat sink technologies can be employed successfully with the LED lamp 100.

Figure 2:
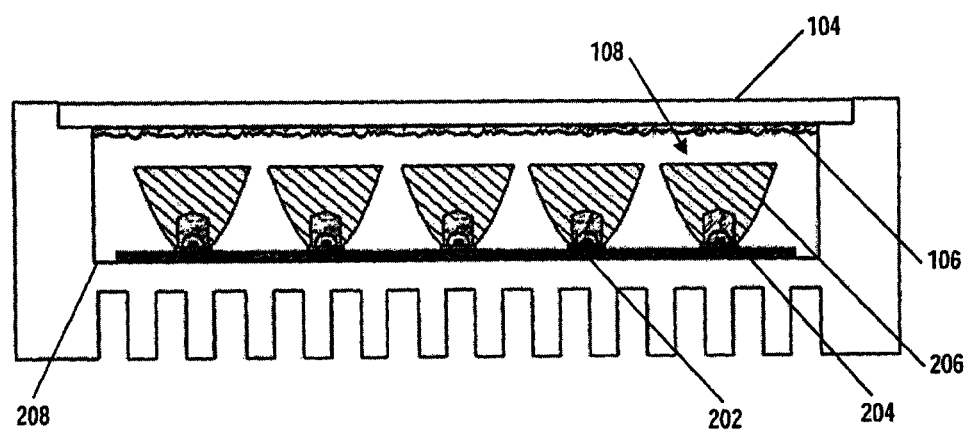
FIG. 2 illustrates an exploded cross-sectional view of the LED lamp illustrated in FIG. 1.

In one embodiment, the bezel 112 can facilitate the engagement and securing of the screen 104 in the opening 103 of the housing 102. The bezel 112 can be plastic, rubber or another material to secure the screen 104 in the opening 103. In alternate embodiments, the bezel 112 can be omitted entirely and the screen 104 can simply be glued around its underside surface and set flush with the housing 102, as shown in FIG. 2. In some embodiments, paint can be applied to the underside surface of the screen 104 that would contact the housing 104 in order to mask the deposition of glue that secures the screen 104 to the housing 102.

FIG. 2 illustrates an exploded cross-sectional view of the LED lamp 100 illustrated in FIG. 1. As illustrated in FIG. 2, the layer 106 (e.g., a third optical system) is disposed atop the underside surface of the screen 104 and includes a random or pseudo-random array of lenses formed in a three-dimensional coordinate system over at least a portion of the layer 106, as will be described in greater detail below with reference to FIG. 6. The housing 102 secures a circuit board 202 to which the one or more light-source assemblies 108 are electrically secured. For example, the circuit board 202 can be secured to a base 208 of the housing 102.

Each of the light-source assemblies 108 includes an LED assembly 204 (e.g., a first optical system) and a lens 206 (e.g., second optical system). The LED assembly 204 is electrically secured to a circuit board 202 and is configured to generate light (e.g., visible light, infrared light, ultraviolet light, or other spectrum(s) of light).

The lens 206 is disposed and secured over the LED assembly 204. The light-source assemblies 108 can be secured to one another in a predetermined arrangement to facilitate the disposing and securing of a plurality of light-source assemblies 108 onto a respective plurality of LED assemblies 204. For example, an optically-transparent plate can be secured to the top of the lenses 206, bottom of lenses (respective cutouts formed for the channels shown in FIG. 5) or in another fashion, facilitating the alignment of the lenses 206 in the predetermined arrangement. The circuit board 202 is electrically connected to a power supply (e.g., including a rectifier) such that the LED chip 304 of the LED assembly 204 can emit light. More specifically, the base 208 can secure the power supply (and rectifier) to supply the required power to the LED lamp 100. An example LED assembly 204 is described in greater detail below with reference to FIG. 3.

Moreover, the lens 206 is configured to carry light rays from the LED assembly 204. Specifically, the lens 206 reflects first light rays, transmits second rays, and refracts third rays, as will be described in greater detail below with reference to FIGS. 5 and 7. The lens 206 is made of an optically-transparent material that is the same as the materials already described herein, or different than the materials described herein. The lens 206 has a third index of refraction. In one or more embodiments, the third index of refraction of the lens 206 is the same or similar to the first and second indices of refraction of the screen 104 and the layer 106, respectively (e.g., about 1.4 to about 1.6).

Figure 3:
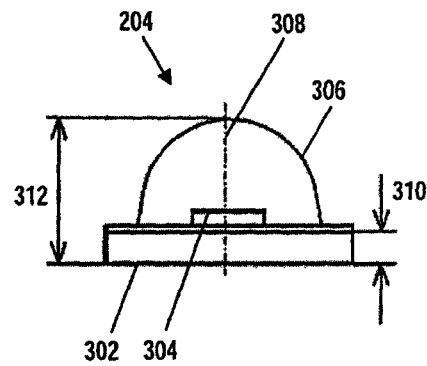
FIG. 3 illustrates an exploded side view of an example LED assembly illustrated in FIG. 2.

FIG. 3 illustrates an exploded side view of an example LED assembly 204 illustrated in FIG. 2. The LED assembly 204 (e.g., first optical system) includes a circuit board 302, LED chip 304, and dome 306. The height 312 of the LED assembly 204 can be about 2 mm, while the height 310 of the circuit board 302 can be about 0.45 mm. Other LED assemblies 204 having different dimensions can be used, such as for integration with variously sized and dimensioned lenses 206.

The LED chip 304 is surface-mounted (electrically mounted) approximately at light axis 308 to the circuit board 302 and the circuit board 302 is electrically secured or mounted to the circuit board 202. The dome 306 is disposed approximately at the light axis 308 and encapsulates the LED chip 304 with respect to the circuit board 302. The dome 306 is generally arcuate and diffracts the light emitted from the LED chip 304 from the dome 306 inwards toward the optical axis 308, reducing the angulation of the light cone emitted from the LED chip 304. Generally, the example LED chip 304 generates a light cone of approximately 180 degrees, which is refracted by the dome 306 to generate a light cone of approximately 120 degrees.

The dome 306 can be made of optically-transparent silicone or another material, which provides thermal heat resistance and has a fourth index of refraction from about 1.4 to about 1.6. The fourth index of refraction of the dome 306 can be the same or similar to the other indices of refraction 1-3 of the screen 104, the layer 106, and the lens 206, respectively.

Figure 4:
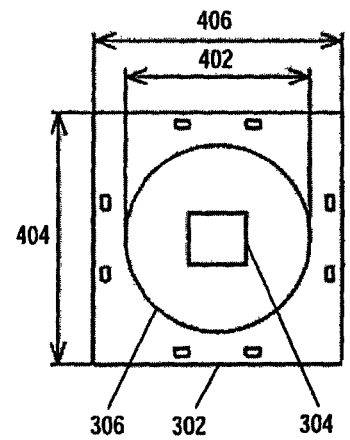
FIG. 4 illustrates a top view of the LED assembly illustrated in FIG. 3.

FIG. 4 illustrates a top view of the LED assembly 204 illustrated in FIG. 3. The dome 306 can have a bottom that is circular and can have a diameter 402 of about 2.6 mm. The circuit board 302 can be square, with the length 404 and the width 404 of the circuit board 302 being about 3.5 mm, respectively. The dimensions of these components can of course be adjusted for various applications. For example, the length 404 and the width 404 of the circuit board 302 can be about 5.5 mm, respectively.

In some embodiments, the LED chip 304 is a square semiconductor chip with a flat top surface that emits a cone of light, from generally perpendicular to the surface of the LED chip 304 to a number of degrees outward (e.g., total of about 180 degrees). In other embodiments, a convoluted chip with angled surfaces can be used not only to increase light output (limiting internal reflection in the chip), but also to increase the outward angle of the light from the convoluted chip. In some embodiments, the dome 306 can be omitted from the LED assembly 204. As will be described hereinafter with reference to the lens 206 in FIG. 5, optically-transparent fill material of the same or similar refractive index as the dome 306 can be disposed in a channel of the lens 206. As the refractive indices of the dome 306 and the fill material are the same or similar, the interface between the dome 306 and the lens 206 is reduced or otherwise eliminated, which effectively eliminates reflection in relation to the lens 206.

The LED chip 304 can be any conventional LED or an LED yet to be developed. For example, organic LEDs (OLEDs) can also be used in various embodiments. Moreover, point-source LEDs, which are currently in development by various companies, can similarly be implemented as the LED chip 304.

Figure 5:
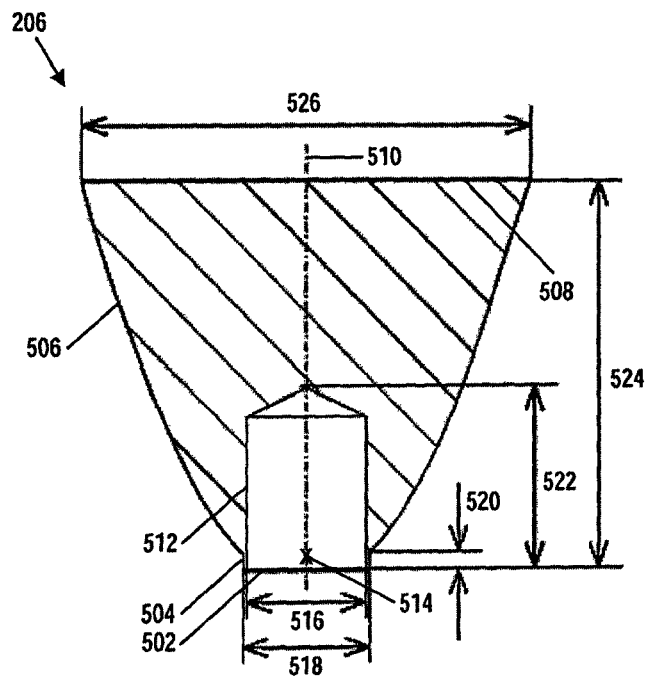
FIG. 5 illustrates an exploded side view of an example lens illustrated in FIG. 2.

FIG. 5 illustrates an exploded side view of the example lens 206 illustrated in FIG. 2. As already described hereinabove, the lens 206 (e.g., second optical system) is made of an optically-transparent material that has a third index of refraction, which is the same or similar to the first, second and fourth indices of refraction of the screen 104, the layer 106, and the dome 306, respectively (e.g., about 1.4 to about 1.6). In some embodiments, the fourth refractive index of the dome 306 is the same as or similar to the third refractive index of the lens 206, while the first and second refractive indices of the screen 104 and the layer 106 are different from the third and fourth refractive indices of the lens 206 and dome 306.

As illustrated in FIG. 5, the lens 206 is made of a solid optically-transparent material (as described hereinabove). The overall height 524 of the lens 206 is about 18 mm. Furthermore, the lens 206 includes a bottom surface 502, a riser section 504, a parabolic section 506, an emitting top surface 508, and a channel 512.

The bottom surface 502 is generally circular and has a diameter that is about 6.0 mm. Specifically, the bottom surface 502 is configured to be secured to the circuit board 302 of the LED assembly 204 or to the circuit board 202, illustrated in FIG. 2. Other diameters or shapes can be selected based on the LED assembly 204, such that the lens 206 can be secured to the LED assembly 204 or to the circuit board 202. Moreover, other securing mechanisms can be used to secure the lens 206 at the desired height with respect to the LED chip 304. It is important to note that the lens 206 should be structured and secured such that the LED chip 304 can be disposed in the channel 512 at or about the focus 514 of the parabolic section 506 of the lens 206, as described in greater detail immediately below.

The riser section 504 extends upward from the bottom surface 502 and is formed to be generally tubular about axis 510, having a similar outer width (diameter) 518 of about 6.0 mm. The height 520 of the riser section 504 is about 0.75 mm. The parabolic section 506 extends upward from the riser section 504, also being formed about axis 510 and having a focus 514. Moreover, the parabolic section 506 includes the emitting top surface 508. The height 520 of riser section 504 is defined such that the LED chip 304 of FIG. 3 can be disposed at or about the focus 514 of the parabolic section 506.

Moreover, the parabolic section 506 is defined by an equation $y^2=kx$, where x is the x-axis (axis 510), y is the y-axis, and k is a coefficient correlated to an angle of the light (e.g., light cone) emitted from the LED chip 304 in relation to the x-axis (axis 510), as illustrated in FIG. 3. It should be noted that axis 510 of the lens 206 is approximately coincident with the light axis 308 of LED assembly 204. The coefficient k is selected such that the angle of first light rays emitted from the LED chip 304 with respect to the axis 510 is over the critical incidence angle with respect to the parabolic section 506, allowing the first rays to internally reflect in the parabolic section 506 and thus be collimated through the top surface 508. In some embodiments, for example, the coefficient k can have a value of 6 for the LED assembly 204, as described with reference to FIG. 3. The second light rays that are parallel to the axis 510 can be transmitted through lens 206 and the top surface 510, without reflection or refraction. Third light rays that are between the first light rays and the second light rays (e.g., light rays that are at an angle with respect to the axis 510 and are below the critical angle) can be refracted (focused) toward the axis 510 at the top surface 508, as the third light rays enter a medium (e.g., air) that has a different (smaller) refractive index than refractive index of the lens 206.

The channel 512 extends from and through the bottom surface 502, through the riser section 504 and partially into the parabolic section of the lens 206. The channel 512 is tubular and is also formed about the axis 510, approximately coincident with the light axis 308. Moreover, the inner width (diameter) 516 of the channel 512 is about 5.6 mm and the overall height 522 of the channel 512 is about 8.5 mm. The channel 512 can be drilled in the lens 206. Alternative methods for forming the channel 512 in the lens 206 can be used.

In some embodiments, one or more of the inner width (diameter) 516, outer width (diameter) 518 and the height 522 of the channel 512 can be varied. For example, the height 522 can be shortened and/or the diameter 516 can be made smaller to accommodate the LED assembly 204. A predetermined amount of optically-transparent fill material can be disposed (dispensed) in the channel 512, as will be described in greater detail with reference to FIG. 7. Moreover, while the channel 512 is shown to be tubular, the channel can also have an irregular shape that can accommodate the LED assembly 204. The dimensions of the channel 512 should be selected such that the LED chip 304 can be disposed in the channel 512 at or about the focus 514 of the parabolic section 506 and a sufficient amount of fill material can be dispensed into the channel 512, in order to eliminate the interface between the dome 306 and lens 206, or the interface between the LED chip 304 and lens 206 if the dome 306 is omitted.

Figure 6:
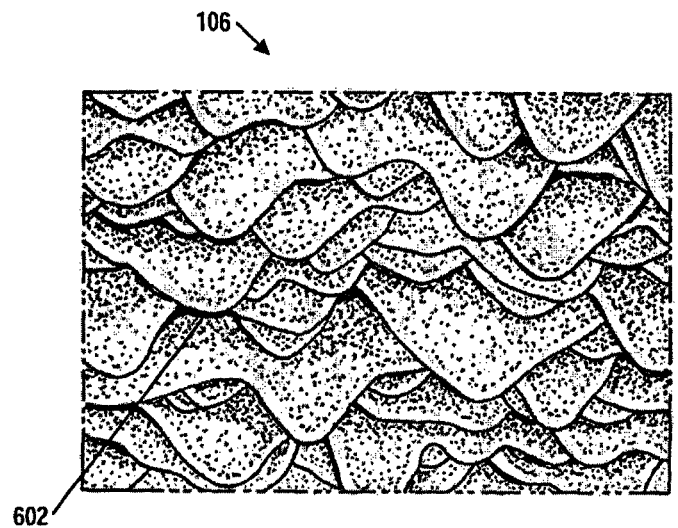
FIG. 6 illustrates a bottom surface of an example layer illustrated in FIGS. 1 and 2.

FIG. 6 illustrates a bottom surface of the example layer 106 illustrated in FIGS. 1 and 2. As already described hereinabove, the layer 106 (e.g., third optical system) is configured to refract light as well as to diffuse light that is incident upon the layer 106.

More specifically, the layer 106 includes a random or pseudo-random array of lenses 602 formed in a three-dimensional coordinate system. The lenses 602 can be a random or pseudo-random number, shape and height of variously sloping peaks and valleys along the layer 106. The lenses 602 can also be a random or pseudo-random number, shape and height of prisms (e.g., right-angle prisms, penta prisms, equilateral prisms, Schmidt prisms, amici-roof prisms cone prisms, etcetera). The different types of lenses can be combined and can overlap to form various shapes in the same layer 106. What is important is that the differently-angled surfaces are formed such that various light rays (e.g., peripheral light rays) incident on the layer 106 at different angulations can be refracted to the outside of the LED lamp 100 and not reflected to the inside of the housing 102, as could be the case with the screen 104. The array of lenses 602 can be generated by matrix printing, laser etching, mechanical etching, casting, press forming, sputtering or one or more other ways to generate the array of lenses 602 included in the layer 106.

As described hereinabove, the layer 106 is disposed or deposited over the underside surface of the screen 104. Specifically, this mitigates or eliminates the direct incidence of light rays with the screen 104 at the critical angle and reduces the possible internal reflection of light rays from the screen 104 back into the housing 102, which improves the overall lighting efficacy (efficiency) of the LED lamp 100.

In some embodiments, the layer 106 can be omitted from the LED lamp 100. Instead, the screen 104 can incorporate an underside surface having the array of lenses 602, as described with respect to the layer 106. This can be accomplished, for example, by laser/mechanical etching of the array of lenses into at least a portion of the underside surface of the screen 104, by casting the screen 104 to have at least a portion of the underside surface that includes the array of lenses 602, or by an alternative method that can form the array of lenses 602 in at least a portion of the underside surface of the screen 104 in the three-dimensional coordinate system. The remaining portion of the underside surface of the screen 104 can be planar in order to secure to the screen 104 to the housing 102, as described hereinabove with reference to FIGS. 1 and 2.

Figure 7:
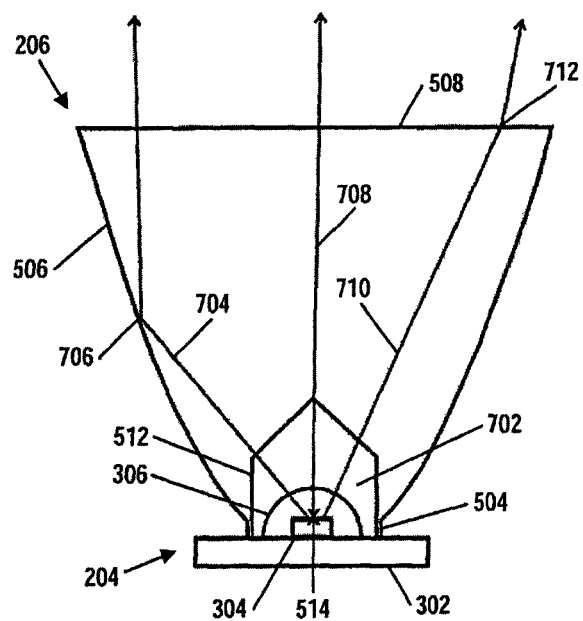
FIG. 7 illustrates several light rays passing from the LED assembly of FIG. 3 through the lens of FIG. 5.

FIG. 7 illustrates several light rays passing from the LED assembly 204 of FIG. 3 through the lens 206 of FIG. 5. As illustrated in FIG. 7, at least a portion of the LED assembly 204 is disposed in the channel 512, with the LED chip 304 being disposed at or about the focus 514 of the parabolic section 506. More specifically, the emitting surface of the LED chip 304 is disposed at or about the focus 514 associated with the lens 206 and along the axis 510 (illustrated in FIG. 5), which is approximately coincident with the light-axis 308 of the LED assembly 204 (illustrated in FIG. 3).

In some embodiments, the channel 512 is filled with a soft or pliable optically-transparent fill material 702, which is of the same or similar refractive index (e.g., 1.4 to 1.6) as the lens 206 and the dome 306. The optically-transparent fill material 702 can be a gel or another soft/pliable optically-transparent material having a similar or matching index of refraction as the lens 206 and the dome 306. The optically-transparent fill material 702 is heat resistant and soft/pliable, mitigating or eliminating compressive forces from the optically-transparent fill material 702 on the LED assembly 204, when the LED assembly 204 expands in operation due to heat produced by the LED assembly 204.

The optically-transparent material fill 702 displaces air from channel 512 and unifies the lens 206, dome 306, thereby eliminating the interface between the channel 512 of the lens 206 and the dome 306 of the LED assembly 204. This mitigates possible reflection of rays light rays that are emitted from the LED chip 304 to the inside of the channel 512 and enables the light rays to be transmitted through the parabolic section 506 of the lens 206 without refraction at the channel 512 and into the lens 206.

In embodiments where the dome 306 is omitted, the optically-transparent fill material 702 can unify the LED chip 304 and the lens 206. While the optically-transparent fill material 702 possesses the same or similar refractive index (e.g., 1.4 to 1.6) as the lens 206 and the dome 306, refraction between the LED chip 304 and the optically-transparent fill material 702 can be different than between the dome 306 of the LED assembly 204 and ambient air. Accordingly, as described hereinabove with reference to FIG. 5, the coefficient k in the foregoing equation $y^2=kx$ for the parabolic section 506 can be selected to correlate to the angle of the light emitted from the LED chip 304 and refracted at the interface with the optically-transparent material 702. Thereafter, with the optically-transparent fill material 702 and the lens 206 having the same or similar refractive indices, the light passes through the channel 512 into the lens 206 without (or with minimal) refraction.

Moreover, refraction which would have otherwise occurred at the interface of the dome 306 and ambient air, is thus displaced to the interface of the top surface 508 of the lens 206 and the ambient air, providing improved distribution of the light emitted from the LED chip 304 through the lens 206.

Now with reference to first light rays 704, second light rays 708 and third light rays 710, as illustrated in FIG. 7. For example, the first light rays 704 emitted from the LED chip 304 are reflected rays because they are at or over the critical angle with respect to the parabolic lens 706, and after passing through the dome 306 (or in alternative embodiments without the dome 306) and the optically transparent fill material 702, they are internally reflected to form collimated light through the top surface 508 of the lens 206.

As another example, the second light rays 708 emitted from the LED chip 304 are direct rays that are parallel to the axis 510, as illustrated in FIG. 5, and after passing through the dome 306 (or in alternative embodiments without the dome 306) and the optically transparent fill material 702, are transmitted through the top surface 508 without refraction.

As a further example, the third light rays 710 emitted from the LED chip 304 are direct rays that are angled between the first light rays and the second light rays, and after passing through the dome 306 (or in alternative embodiments without the dome 306) and the optically transparent fill material 702, they are refracted at the interface 712 of the top surface 508 of the lens 206 and a medium (e.g., air) contacting the top surface 508 toward axis 510 (illustrated in FIG. 5), because these media have different refractive indices and the third light rays are at an angle with respect to the top surface 508.

As clearly illustrated in FIG. 7, the mitigation or elimination of internal reflection of the light rays into the channel 512 coupled with the refraction of third light rays toward the axis 510, improves the overall lighting efficiency and distribution of the LED lamp 100.

Figure 8:
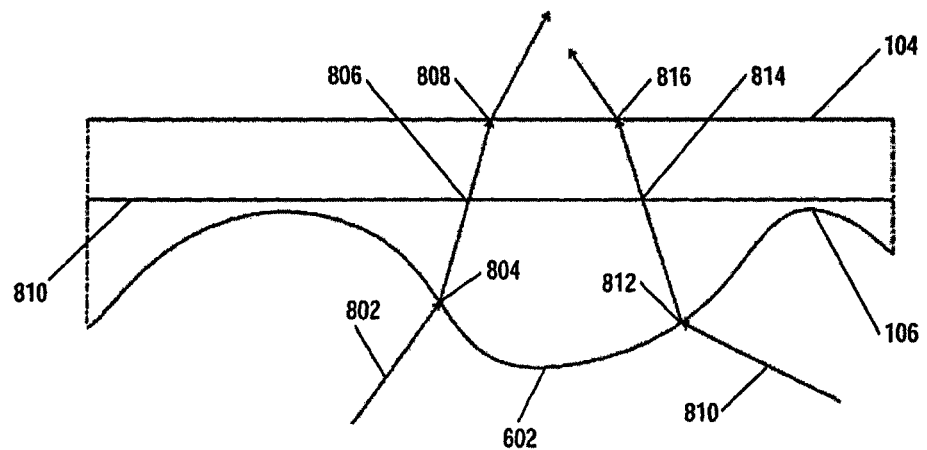
FIG. 8 illustrates several light rays passing through a lens formed in the layer of FIGS. 2 and 6 and through the screen of FIGS. 1 and 2.

FIG. 8 illustrates an exploded view of several light rays passing through a lens 602 formed in the layer 106 of FIGS. 2 and 6 and through an outer screen of FIGS. 1 and 2.

As already described herein, the layer 106 is configured to refract light as well as to diffuse light that is incident upon the layer 106. The layer 106 includes a random or pseudo-random array of lenses 602 formed in a three-dimensional coordinate system over at least a portion of the layer 106. In alternate embodiments, the layer 106 can be omitted and the random or pseudo-random array of lenses 602 can be formed in a three-dimensional coordinate system in at least a portion of the underside surface of the screen 104. Accordingly, the following description concerning light transmission would apply equally to such modified screen 104.

Example light rays 802, 810, which can be emitted from one or more of the light-source assemblies 108, are illustrated to describe the optical cooperation of the screen 104 and the layer 106.

Light ray 802 traveling though a medium (e.g., air) is incident at an angle with respect to the lens 602 of the layer 106. The light ray 802 is refracted at the interface 804 based on the incidence angle with respect to the lens 602 and the difference in the refractive indices between the medium (e.g., about 1.0 for air) and the layer 106 (e.g., about 1.4 to about 1.6 for layer 106). Moreover, the light ray 802 passes without refraction through the eliminated interface 806 between the layer 106 and the screen 104. The light ray 802 then exits the screen 104 into the ambient atmosphere outside the LED map 100, being refracted at interface 808 based on the angle of incidence with respect to the screen 104 and refractive indices between the ambient atmosphere and the screen 104.

Light ray 810 also traveling though the medium (e.g., air) is incident at an angle with respect to the lens 602 of the layer 106. This angle can be a critical angle with respect to the screen 104 (without layer 106), ordinarily resulting in internal reflection to the inside of housing 102 if the light ray 810 were incident directly on the screen 104. However, the light ray 810 is refracted at the interface 812 with lens 602 based on the incidence angle with respect to the lens 602 and the difference in the refractive indices between the medium (e.g., air) and the layer 106. Moreover, the light ray 810 passes without refraction through the eliminated interface 814 between the layer 106 and the screen 104. Thereafter, the light ray 810 exits the screen 104 into the ambient atmosphere outside the LED map 100, being refracted at interface 816 based on the angle of incidence with respect to the screen 104 and refractive indices between the ambient atmosphere and the screen 104.

As illustrated in FIG. 8, the combination of the layer 106 with the screen 104 reduces the possible internal reflection of light rays from the screen 104 into the housing 102. Furthermore, the layer 106 refracts and diffuses the light rays light that are incident upon the layer 106 to generate uniform lighting outside the LED lamp 100, improving the overall lighting efficacy of the LED lamp 100. More specifically, the uniform lighting reduces a blinding effect on a user's eyes, and at the same time reduces eye fatigue, thus positively affecting the reaction rate of the user's eyes to the light emitted from the LED lamp 100. Similar advantages can be achieved by the array of lenses 602 formed in the screen 104 as described herein.

Figure 9:
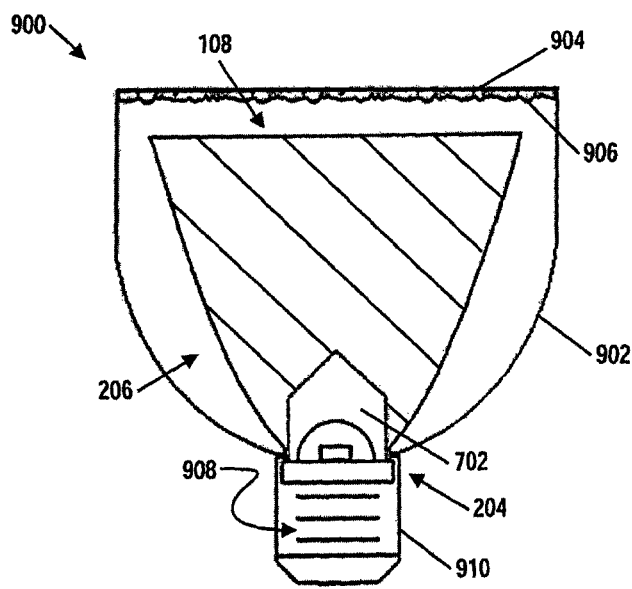
FIG. 9 illustrates another example light-emitting diode (LED) lamp.

FIG. 9 illustrates another example light-emitting diode (LED) lamp 900. The LED lamp 900 includes a housing 902, screen 904, layer 906 (e.g., third optical system), and at least one light-source assembly 108.

The LED lamp 900 can be screwed into or otherwise secured to a lighting fixture to provide light. For example, the LED lamp 900 can be inserted into a lantern/luminaire (not shown). The LED lamp 900 can be used in a lighting fixture incorporated into overhang ceilings, can also be incorporated into streetlights to provide areal lighting for residential as well as business complexes, can further be used for interior lighting of warehouses and exterior lots, and in one or more other lighting applications as may be desired.

The housing 902 can have different form factors for various lighting applications. In some embodiments, the housing 902 is approximately spherical, elliptical, tubular or a combination of various geometric shapes that can be used in a lighting fixture. The housing 902 can generally have any desired dimensions to secure the at least one light-source assembly 108, and in some cases, one or more electrical/electronic components (e.g., power supply), such that the LED chip 304 of the at least one light-source assembly 108 can emit light. In some embodiments, the housing 902 can be secured to the riser 504 of the lens 206, for example, using cement, glue or other heat-resistant connection. The opening 908 in the base 910 of the housing 902 can secure a power supply, which can include a rectifier, to supply power to the at least one light-source assembly 108. The base 910 allows the power supply to be electrically connected to a source of electricity (not shown) via the lighting fixture, which can provide sufficient electricity to the power supply in order to power the at least one light-source assembly 108 to emit light.

The screen 904 is secured to the housing 902 and configured to enclose and to protect the at least one light-source assembly 108, as well as any other electrical components (power supply) disposed in the housing 902 from ambient air and/or weather. The screen 904 can be secured to the housing 902 using a bezel, can be pressure-fit into an opening (not shown) at the top of the housing 902, can be glued into the opening of the housing 902, and/or secured in any other way.

Moreover, the screen 904 is optically transparent and can be made from glass, plastic, thermoplastic (e.g., polymethyl methacrylate), another optically-transparent material or a combination of optically-transparent materials, which allow light to pass without scattering. At least one or both sides of the screen 904 are generally planar, and in some embodiments, the planar sides are parallel. In one or more embodiments, the screen 904 has the same or similar optical properties as the screen 104 (e.g., a first index of refraction from about 1.4 to about 1.6). Other indices of refraction can be chosen for various lighting applications.

The layer 906 is made of an optically-transparent material and is configured to refract light as well as to diffuse light that is incident upon the layer 106. The layer 906 has the same or similar structure as the layer 106, as described above with reference to FIG. 6 and other FIGS. described herein. Specifically, the layer 906 is configured to include a random or pseudo-random array of lenses, which is formed in a three-dimensional coordinate system over at least a portion of the layer 906. In one or more embodiments, the layer 906 has the same or similar optical properties as the layer 106 (e.g., a second index of refraction from about 1.4 to about 1.6).

Furthermore, the layer 906 is configured to mitigate the reflective losses of light rays inside the housing 902 and to provide for refraction of peripheral light rays to the outside of the screen 904 in order to improve in part the overall light efficacy and light distribution of the LED lamp 900. More specifically, the array of lenses included in the layer 906 reduces a possible loss of light—resulting from incidence of a portion of the light on flat non-adjacent surfaces of two media with similar/different indices of refraction—and thus improves the transmission of the light through the screen 904.

The deposition of layer 906 onto the underside of screen 904 is the same or similar to the deposition of layer 106 onto the underside surface of screen 104, as described hereinabove. Similarly, the refractive/diffusive properties of the combination of the screen 904/layer 906 is the same or similar to the combination of screen 104/layer 106, as described in FIG. 8 and any other FIGS. hereinabove.

In some embodiments, the layer 906 can be omitted from the LED lamp 900. Instead, the screen 904 can incorporate an array of lenses executed in a three-dimensional coordinate system in at least a portion of its underside surface, as was described hereinabove with respect to the layer 106 in FIG. 6. The remaining portion of the underside surface of the screen 904 can be planar in order to secure to the screen 904 to the housing 902.

The at least one light-source assembly 108 is configured to mitigate the reflective losses of light rays inside the housing 902 and to provide for refraction (or focusing) of peripheral light rays toward the layer 906 in order to improve in part the overall light efficacy (efficiency) of the LED lamp 900. The components of the light-source assembly 108 are described hereinabove with reference to FIGS. 2-5.

The base 910 of the housing 902 can allow heat caused by the at least one light-source assembly 108 and/or other electric components of the LED lamp 900 to effectively dissipate via the electrical connection of the base 910 to a lighting fixture in which it is secured. While the base 910 of the housing 902 is shown to include a thread for being screwed into a receiving receptacle of the lighting fixture, it should be noted that the base 910 can provide any electrical connection (e.g., prongs) to a respective receptacle in the lighting fixture.

In operation according to FIGS. 1-9, electrical energy is supplied via a power supply and rectifier (not shown) to the light-emitting diode (LED) chip 304 in the LED assembly 204. The LED chip 304 is configured to emit light, which passes successively through the LED assembly 204 (e.g., first optical system) and the lens 206 (e.g., second optical system), and which incident upon the layer 106, 906 (e.g., third optical system) deposited on the inner (underside) surface of the screen 104, 904, is refracted/diffused through the screen 104, 904 to the outside of the LED lamp 100, 900. In those embodiments where the screen 104, 904 is formed with an array of lenses as described herein, it is the screen 104, 904 that can be considered to be the third optical system. Accordingly, the LED lamp 100, 900 minimizes reflective losses of light and refracts peripheral light rays, which improve the overall light efficacy (efficiency) and light distribution characteristics of the LED lamp 100, 900.

The lens 206 of the LED lamp 100, 900 carries the light emitted from the LED chip 304. Specifically, the lens 206 filled with fill material 702 eliminates the interface between the LED assembly 204 and the lens 206, mitigating reflective losses associated with the light. Moreover, the lens 206 internally reflects first light rays, transmits second rays, and refracts third rays of the emitted light, as described above with reference to FIGS. 5 and 7.

The layer 106, 906 (or alternatively, the screen 104, 904 provided with the array of lenses) redistributes (refracts/diffuses) the light for passage through the screen 104, 904. Specifically, the layer 106, 906 reduces a possible loss of light—resulting from incidence of a portion of the light on flat non-adjacent surfaces of two media with similar/different indices of refraction—and thus improves the transmission and distribution of the light through the screen 104, 904.

Moreover, the LED lamp 100, 900 possesses high ecological properties because the refractive/diffusive properties of the layer 106, 906 (or alternatively, the screen 104, 904 provided with the array of lenses) produce a uniform lighting, which reduces a blinding effect on a user's eyes, and at the same time reduces eye fatigue, thus positively affecting the reaction rate of the user's eyes to the light emitted from the LED lamp 100, 900.

The LED lamp 100, 900 further provides greater safety during its operation. In the case that the screen 104, 904 breaks, the layer 106, 906 deposited on its inner (underside) surface of the screen 104, 904 bonds and holds the splinters of the screen 104, 904.

Accordingly, the LED lamp 100, 900 provides great accuracy in the formation of light, which allows light rays to be used effectively, both due to a minimal number of optical interfaces (transitions) between media and due to refraction of peripheral light rays.

Thus, a light-emitting diode (LED) lamp, which mitigates reflective losses of light rays and provides for refraction of peripheral rays to improve the overall light efficacy (efficiency) of the LED lamp, has been described. Although specific example embodiments have been described, it will be evident that various modifications and changes may be made to these embodiments without departing from the broader spirit and scope of the invention.

Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments shown are described in sufficient detail to enable those skilled in the art to practice the teachings disclosed herein. Other embodiments may be utilized and derived therefrom, such that structural and logical substitutions and changes may be made without departing from the scope of this application.

The foregoing detailed description, therefore, is not to be taken in a limiting sense, and the scope of various embodiments is defined only by the appended claims, along with the full range of equivalents to which such claims are entitled.

The Abstract is provided to comply with 37 C.F.R. § 1.72(b) and will allow the reader to quickly ascertain the nature of the technical disclosure of this application. It is submitted with the understanding that it will not be used to interpret or limit the scope or the meaning of the claims.

Although specific embodiments have been shown and described herein, it should be appreciated that any arrangement calculated to achieve the same purpose may be substituted for the specific embodiments shown. This application is intended to cover any and all adaptations or variations of various embodiments. Combinations of the above embodiments and other embodiments not specifically described herein will be apparent to those of skill in the art upon reviewing the above description.

In the foregoing detailed description, various features may be grouped together in a single embodiment for the purpose of streamlining the disclosure of this application. This method of disclosure is not to be interpreted as reflecting that the claimed embodiments have more features than are expressly recited in each claim. Rather, as the following claims reflect, inventive subject matter lies in less than all features of a single disclosed embodiment.

Moreover, it is contemplated that the features or components of the various embodiments described herein can be combined into different combinations that are not explicitly enumerated in the foregoing detailed description and that such combinations can similarly stand on their own as separate example embodiments that can be claimed.

The invention claimed is:

1. A light-emitting diode lamp comprising:
an optically-transparent lens including a parabolic section, the parabolic section defined about an axis and having a focus, the parabolic section comprising:
a continuous surface extending from the axis to a periphery of the parabolic section at a first end of the parabolic section, and
a channel extending along the axis at least partially inside the parabolic section at a second end of the parabolic section, the second end being substantially opposed to the first end; and
a light-emitting diode assembly comprising a light-emitting chip and an optically-transparent dome, the light-emitting chip disposed in the channel at the focus of the parabolic section, the optically-transparent dome disposed in the channel such that an interior space is formed between the optically-transparent dome and the optically-transparent lens, the interior space filled with an optically-transparent material having an index of refraction approximately equal to an index of refraction of the optically-transparent lens that eliminates or reduces effect of an optical interface between the optically-transparent material and the optically-transparent lens on direction of light emitted by the light-emitting diode chip.

2. The light-emitting diode lamp according to claim 1, further comprising a riser section extending from the second end of the parabolic section, such that the channel is continuous through the riser and at least partially inside the parabolic section.

3. The light-emitting diode lamp according to claim 2, wherein the light-emitting diode assembly comprises a circuit board to which the light-emitting diode chip is electrically secured, and the optically-transparent dome is secured to the circuit board, wherein the optically-transparent dome encapsulates the light-emitting chip.

4. The light-emitting diode lamp according to claim 3, wherein the optically-transparent lens is secured to the circuit board of the light-emitting diode assembly such that the optically-transparent dome and the light-emitting diode chip are disposed in the channel at approximately the axis.

5. The light-emitting diode lamp according to claim 3, wherein the circuit board is electrically secured to a second circuit board.

6. The light-emitting diode lamp according to claim 1, wherein the optically-transparent lens is made from an optically-transparent material that is continuous from the channel to the periphery and the continuous surface of the optically-transparent lens.

7. The light-emitting diode lamp according to claim 1, wherein the optically-transparent material is an optically-transparent gel.

8. The light-emitting diode lamp according to claim 1, wherein the optically transparent material is at least one of heat resistant and pliable.

9. The light-emitting diode lamp according to claim 1, wherein the optically-transparent material has a first index of refraction, the optically-transparent lens has a second index of refraction, and the first index of refraction is equal to the second index of refraction.

10. The light-emitting diode lamp according to claim 1, wherein the index of refraction of the optically-transparent material and the index of refraction of the optically-transparent lens are in a range of about 1.4 to about 1.6.

11. The light-emitting diode lamp according to claim 1, wherein the light-emitting diode lamp is a lighting fixture or secured to a lighting fixture.

12. The light-emitting diode lamp according to claim 1, further comprising:

an optically-transparent screen disposed in relation to the optically-transparent lens, the optically-transparent screen having a first side and a substantially opposed second side; and an optically-transparent layer deposited over at least a portion of the first side of the optically-transparent screen, the optically-transparent layer including an array of lenses formed in a three-dimensional coordinate system to refract and defuse light emitted from the light-emitting chip and passed through the optically-transparent lens such that the light passes through the first side and then through the second side of the optically-transparent screen.

13. The light-emitting diode lamp according to claim 12, wherein the array of lenses is at least one of random and pseudo-random.

14. The light-emitting diode lamp according to claim 12, wherein the array of lenses includes one or more prisms.

15. The light-emitting diode lamp according to claim 12, wherein the optically-transparent screen has a first index of refraction, the optically-transparent layer has a second index of refraction, and the first index of refraction is equal to the second index of refraction.

16. The light-emitting diode lamp according to claim 12, wherein the index of refraction of the optically-transparent screen and the index of refraction of the optically-transparent layer are in a range of about 1.4 to about 1.6.

17. The light-emitting diode lamp according to claim 1, further comprising an optically-transparent screen disposed in relation to the optically-transparent lens, the optically-transparent screen having a first side and a substantially opposed second side, wherein the first side is formed to include an array of lenses in a three-dimensional coordinate system to refract and defuse light emitted from the light-emitting diode chip and passed through the optically-transparent lens such that the light passes through the array of lenses in the first side and then through the second side.

18. The light-emitting diode lamp according to claim 17, wherein the array of lenses is at least one of random and pseudo-random.

19. The light-emitting diode lamp according to claim 17, wherein the array of lenses includes one or more prisms.

20. The light-emitting diode lamp according to claim 17, wherein the index of refraction of the optically-transparent screen is in a range of about 1.4 to about 1.6.

* * * * *